United States Patent [19]

Mole

[11] Patent Number: 5,201,218

[45] Date of Patent: Apr. 13, 1993

[54] FLEXURE TWO SHELL WITH SEPARATE AXIAL, SIX COMPONENT BALANCE

[75] Inventor: Philip J. Mole, San Diego, Calif.

[73] Assignee: General Dynamics Corporation, Space Systems Division, San Diego, Calif.

[21] Appl. No.: 795,168

[22] Filed: Nov. 19, 1991

[51] Int. Cl.$^5$ .............................................. G01M 9/00
[52] U.S. Cl. .................................. 73/147; 73/862.044; 73/862.045; 338/2
[58] Field of Search ............ 73/147, 862.041, 862.042, 73/862.043, 862.044, 862.045; 338/4, 2, 3, 5

[56] References Cited

U.S. PATENT DOCUMENTS

| | | | |
|---|---|---|---|
| 2,918,816 | 12/1959 | Ormond | 73/147 |
| 3,100,990 | 8/1963 | Dimeff | 73/147 |
| 3,878,713 | 4/1975 | Mole | 73/147 |
| 4,074,567 | 2/1978 | Horanoff | 73/147 |
| 4,938,059 | 7/1990 | Faucher et al. | 73/147 |

*Primary Examiner*—Donald O. Woodiel
*Attorney, Agent, or Firm*—John R. Duncan; Frank D. Gilliam

[57] ABSTRACT

An improved wind tunnel six component balance having an outer shell assembly that receives a tubular inner rod and an axial member that is received within the interior of the tubular inner rod. The forward and aft ends of the outer shell assembly are connected to the inner rod. The loads imposed on the forward and aft ends of the outer shell assembly are transferred to the inner rod and into the tunnel support system. The central annular section of the outer shell assembly is connected to the axial adapters (four each and into the central disk of the axial member. The principal areas of the axial element are the central disk member, the flexures (two sets forward and two sets aft), the forward and aft gauged sections, and the forward and aft disk members. Normal force, side force, and rolling moment are carried by the outer forward webs of the outer shell assembly. The axial member will transfer the majority of the axial force then the forward and aft outer shell webs. The central disk member transfers the axial force induced by the axial adapters to the forward and aft flexures into the forward and aft gauged sections and finally to the forward and aft disk members which transfers the axial force to the tunnel support system. A plurality of strain gauges are mounted on the respective gauged sections of the axial member and also on the connecting webs of the outer shell assembly.

7 Claims, 4 Drawing Sheets

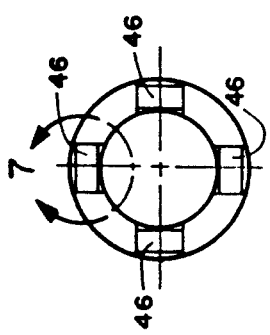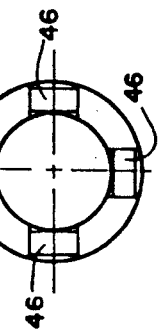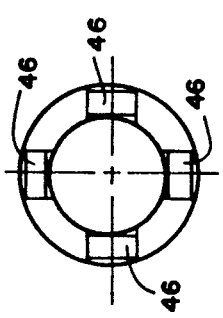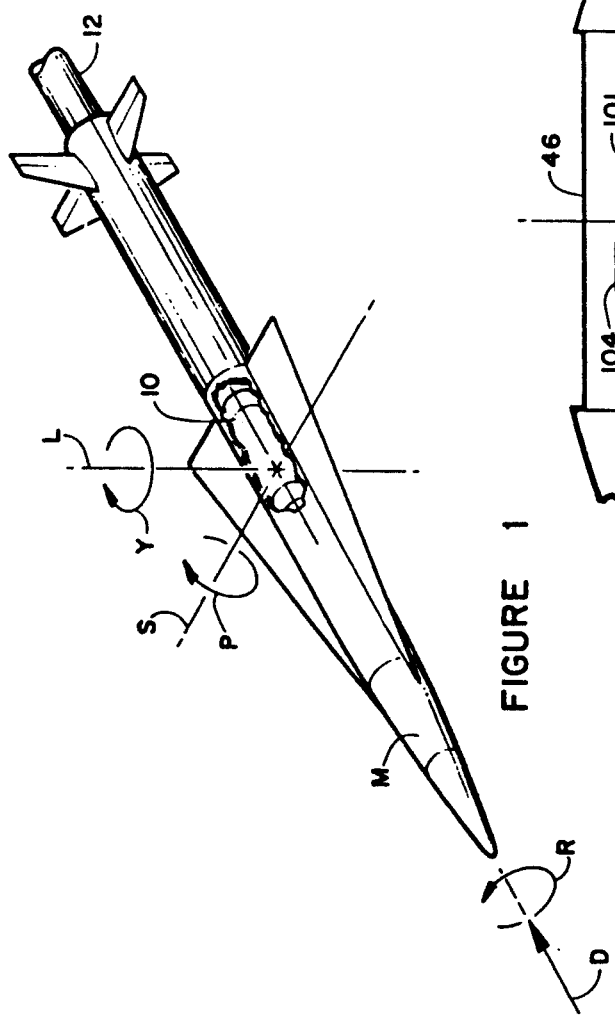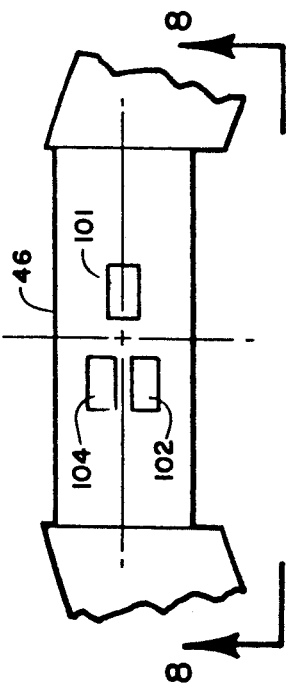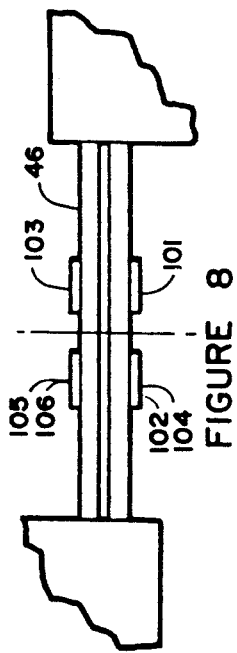

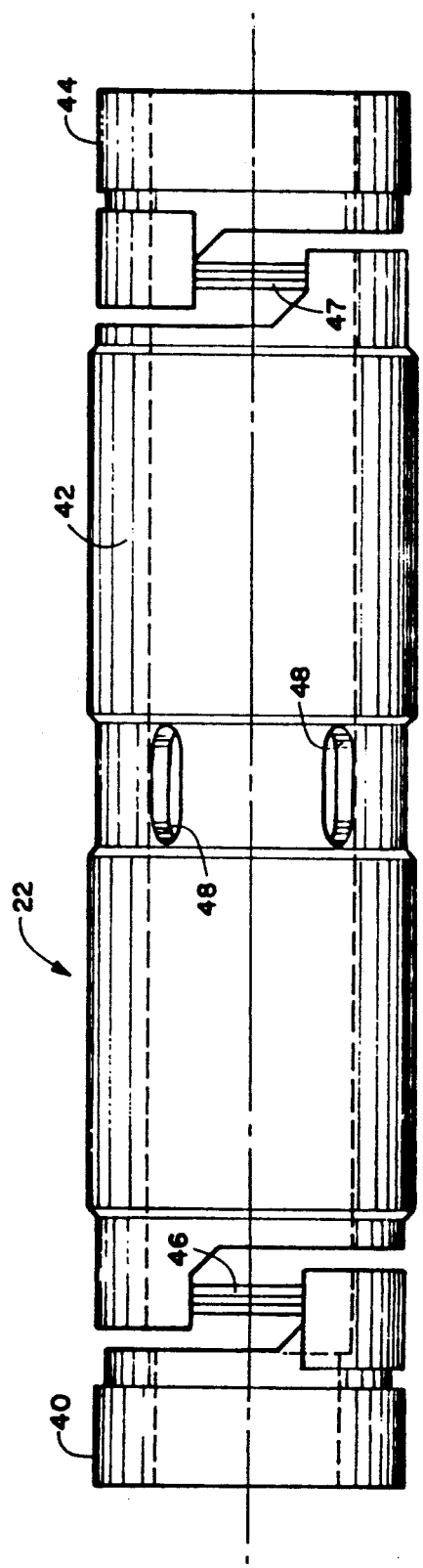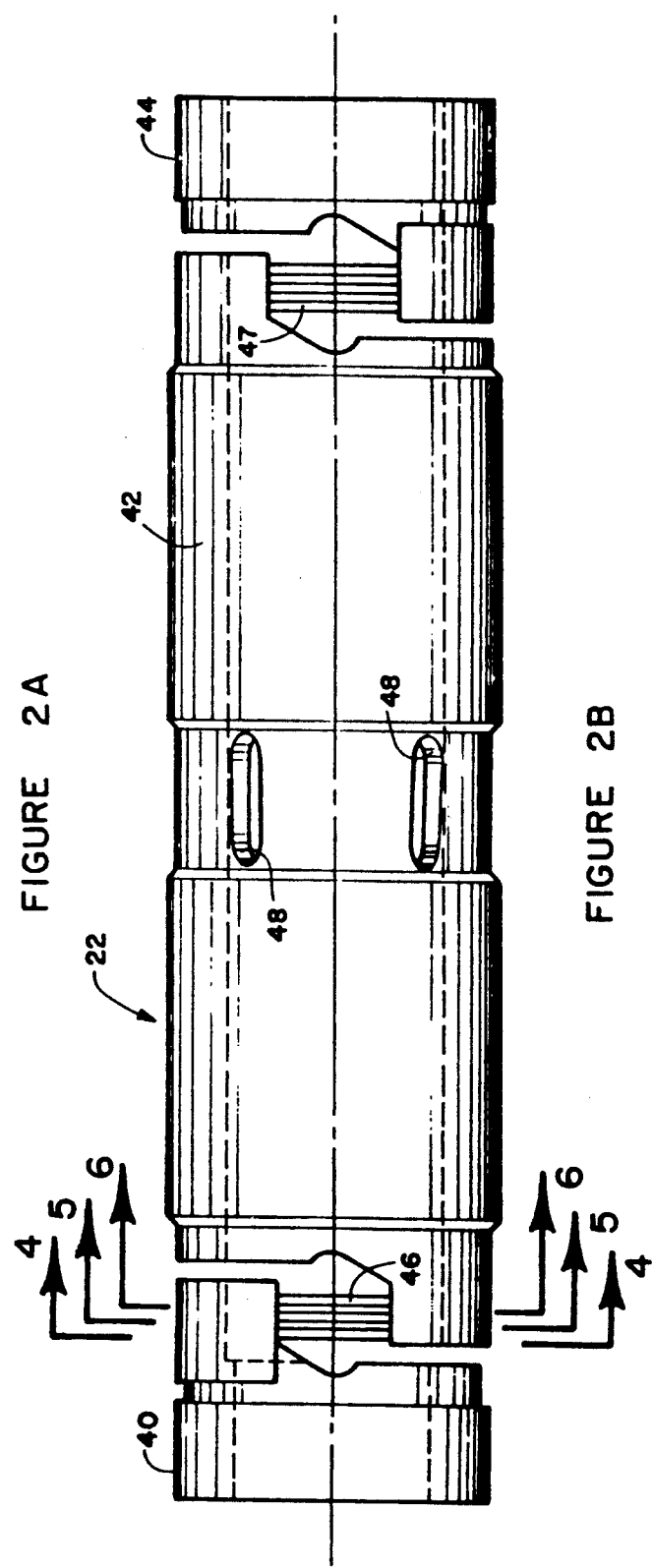

FLEXURE TWO SHELL WITH SEPARATE AXIAL, SIX COMPONENT BALANCE

BACKGROUND OF THE INVENTION

The invention relates generally to force measuring instruments used during non-destructive testing, and more particularly to the measuring of force and moments on wind tunnel models of aircraft.

There are six components of force and moment acting on a wind tunnel model which are of interest to the designer in evaluating the flying qualities of an aircraft. These six components are known by those skilled in the art as lift force, drag force, side force, pitching moment, yawing moment, and rolling moment. By determining the magnitude of these components acting on a scale model in a wind tunnel, certain design parameters can be obtained which will apply to the full scale aircraft.

Prior art strain gage balances have been successfully utilized to measure the forces on wind tunnel models. The moments and forces acting on the model are usually resolved into three components of force and three components of moments but providing different members within the balance that were sensitive only to one or two components. Each of the members carry strain gauges which were connected in combinations that formed Wheatstone bridge circuits. By appropriately connecting the strain gauges, the resulting Wheatstone bridge circuit unbalances could be resolved into readings of the three components of force and three components of moment. All access to the model is by way of the sting support, having the balance attached to the upstream end. The balance is small enough to fit through the aft end of the model into a cavity within the model. Thus it can be seen that all tubes, hoses, wires and such must compete within the balance for the small cross section of area available within the slim cavity of the models.

Wind tunnel and non-destructive testing of scale or full size models require the use of six component load measuring devices to measure all the applied loads on a wind tunnel model or test article within 0.3% of maximum load accuracy. These devices are called six-component balances. These tests have been completed using a conventional two shell structure for many years with the following limitations: 1) Limited load capacity, 2) High temperature sensitivity, 3) Compromise of some components, since each web measures at least three separate components, 4) limited minimum diameter, and 5) The need for more accuracy.

It is an object of the invention to provide a novel two shell flexured balance with a separate axial member that will overcome or significantly reduce most of the problems listed above. The separate axial member will increase the load capacity, by allowing the webs to be designed as flexures. This will decrease the web stresses and remove the strain gauges from the high stress areas. The temperature effects will be reduced due to the increased flexibility of the elements in the non-measuring directions. Each flexure element will measure a maximum of only two components instead of three. By reducing the compromises required, the diameter can be reduced since the webs will require fewer gauges and higher web stress will be allowed. The flexibility will reduce the inneractions and should increase the accuracy.

SUMMARY OF THE INVENTION

The force measuring device described herein is called a flexured wind tunnel balances. It measures six components to produce the following loads: normal force, axial force, side force, pitching moment, yawing moment, and rolling moments.

The balance consists of seven different major parts, the outer shell assembly, the tubular inner rod, four axial adapters, and the axial member.

The outer surface of the central annular section of the outer shell assembly is a precision fit with the bore of the wind tunnel model. Two pins are used to align the model in the roll direction and retain the model on the balance. This outer shell assembly is made from one piece of material machined to the configuration shown in the drawings. The principal areas of the outer shell assembly are the front annular section, the central annular section, and an aft annular sections. A forward web section connects the front annular section to the central annular connection and an aft web section connects the rear annular section to the central annular section. The loads from the model are transferred to the central annular sections. The loads applied to the central annular section are transferred by the forward and aft web sections to the respective front annular section and aft annular section.

The front annular section and the aft annular section of the outer shell assembly are brazed to the inner rod. The tubular inner rod has an aft taper or flange which is connected to the tunnel support system. The loads imposed on the forward and aft ends of the outer shell assembly are transferred to the tubular inner rod and into the tunnel support system.

The central annular section of the outer shell assembly is connected to the axial adapters (four each) and into the central disk member of the axial member. The principal areas of the axial member are the central disk member, the flexures two sets forward and two sets aft), the forward and aft gauged sections, and the forward and aft disk members. Since the flexures cannot transfer normal force, side force or rolling moment due to their very high flexibility, these loads are carried mainly by the outer shell assembly forward and aft web gauge connecting members. The axial member will transfer the majority of the axial force since it is much stiffer in this direction than the long slender forward and aft outer shell web gauge connecting members. The central disk of the axial member transfers the axial force induced by the axial adapters to the forward and aft flexures into the forward and aft gauged sections and finally to the forward and aft disk members. These disk members are pinned to the inner rod, which finally transfers the axial force to the tunnel support system.

In the completely assembled balance, a small annular clearance exists between the outer shell assembly and the inner rod, in the outer shell assembly area of the forward webs and the central annular section. A small annular clearance exists between the central disk member of the axial element and the inner rod. Another small clearance exists around each of the axial adapters and the inner rod.

DESCRIPTION OF THE DRAWINGS

FIG. 1 shows the balance supporting a model within a wind tunnel;

FIG. 2A is a top plan view of the outer shell assembly;

FIG. 2B is a side elevational view of the outer shell assembly;

FIG. 4 is a cross sectional view taken along line 4—4 of FIG. 2B;

FIG. 5 is a cross sectional view taken along line 5—5 of FIG. 2B;

FIG. 6—6 is a cross sectional view taken along line 6—6 of FIG. 2B;

FIG. 7 is an enlarged view taken along circular line 7 of FIG. 4;

FIG. 8 is a view taken along line 8—8 of FIG. 7;

FIG. 9b is a side elevation view of the axial member taken along line 9b—9b of FIG. 9a.

DESCRIPTION OF THE PREFERRED EMBODIMENT

Figure 3:
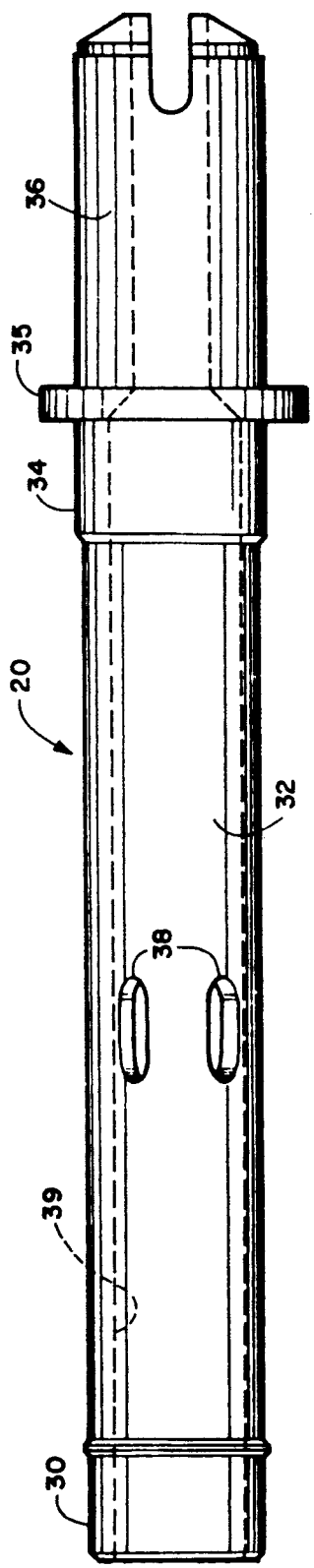
FIG. 3 is a side elevational view of the tubular inner rod.
Figure 10:
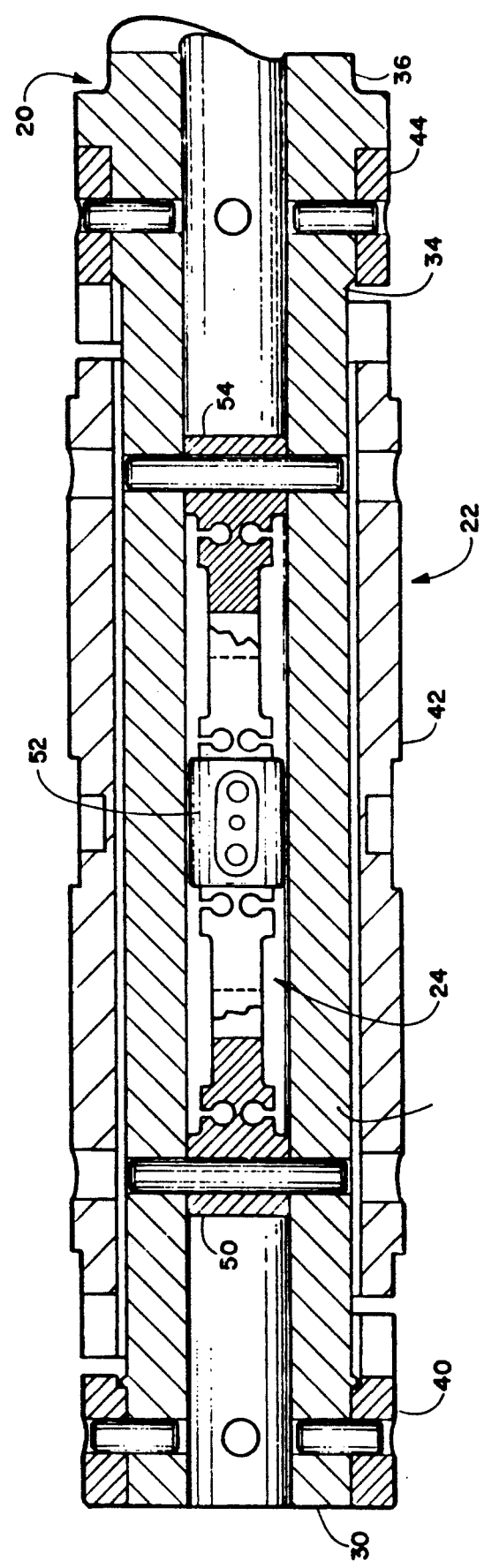
FIG. 10 is a cross sectional view of the assembled balance.

Referring to FIG. 1, there is schematically illustrated a typical installation wherein a model M is positioned in a tunnel by means of the balance 10 and a sting 12 aligned in a generally horizontal position and projecting upstream in the wind tunnel. The model M engages a portion of the balance 10 in such a manner that the three components of moment and the three components of force will be detected by the balance 10. These components are shown in FIG. 1 wherein the roll moment is indicated by the circular arrow R, the pitching moment by the circular arrow P, the yaw moment by the circular arrow Y, the drag force by the arrow D, the side force by the arrow S, and the lift force by the arrow L.

The balance is disposed near the center of gravity of the model and all forces detected by the balance are communicated by means of electrical wires which are routed through the sting 12 through a stationary base (not shown]. In a like manner tubes for communicating fluids, such as air, to the model are routed through the hollow sting. The structure of the balance 10 will be best understood by referring to FIGS. 2-3. Balance 10 has an elongated tubular inner rod 20 that extends throughout the entire length of the model attachment outer shell assembly 22. Axial member 24 is captured within the bore of tubular inner rod 20. These individual components will now be described by referring to specific Figures in the drawings.

Tubular inner rod 20 is illustrated in FIG. 3. It has a front annular portion 30, a center annular portion 32, a rear annular portion 34, a shoulder 35 and a shank portion 36. Four axial adapter slots 38 communicate with the bore 39 of the tubular inner rod.

The outer shell assembly 22 is illustrated in FIGS. 2A and 2B. Outer shell assembly 22 has three major components, front annular section 40, central annular section 42 and rear annular section 44. Front annular section 40 is axially connected to central annular section 42 by conventional side force/normal force web gauged elements 46 such as illustrated and described in U.S. Pat. No. 3,878,713. Likewise, aft annular section 44 is axially connected to central annular section 42 by similar web gauge elements 47. Four axial adapter cutout slots 48 communicate with bore 49.

Outer shell assembly 22 is made from one piece of material which has been machined to the configuration shown. As stated previously, the central annular section 42 is connected to the front and aft annular sections 40 and 44 by long slender web gauged elements 46 and 47. The forward aft annular section is rigidly connected to the non-metric inner rod 20. The central annular section 42 is rigidly connected to the model (metric) side of the balance. It can be clearly understood that normal force, pitching moment side force, and rolling moment loads imposed on the model are transferred to the tubular inner rod 20 by means of the four groups of web gauged elements 46 and the four groups of web gauged elements 47. It can also be understood that by mounting strain gauges on the outer web surface of the web gauged elements, it is possible to record all of the forces on the model except the axial force.

The method of connecting together the strain gauges to obtain the required six components will be described in more detail later. It is sufficient at this time to understand that the outer shell assembly 22 and the axial member 9A are the load cell portion of the balance. That is they are the innerface between the metric and non-metric portions of the balance. The outer shell and axial member are each formed from a single piece of material such as 15-5 stainless stell, or any other suitable material which will exhibit a high degree of uniformity and absence of internal stresses to provide uniform and predictable strength, strain, and fatigue endurance characteristics and produce proportional to load with minimum error.

The method of fabrication would be uniform and would lack material stress produced by separately forming parts like the front annular section, central annular section, aft annular section, and the eight gauged elements and attaching these components together by welding or brazing that produce all the associated internal stresses and inaccurate strain readings typical of joined materials through fillet welding or a brazing process.

FIGS. 4-6 are cross sectional views taken along FIG. 2B. FIG. 7 is an enlarged view of a portion of FIG. 4, showing one of the forward web gauged elements 46 and the strain gauges 101 through 106 bonded to it. FIG. 8 is a top plan view of FIG. 7. A strain gauge placement illustrated is repeated on each of the outer most webs of the forward gauged elements 46 and the outer most webs of the web gauge elements 47. Six precision foil strained gauges are bonded to each of the web groups as shown for a total of 48 gauges.

The gauges 101 through 106 are electrically connected in Wheatstone bridge circuits in various combinations to measure the sums and differences of loads and moments to obtain five force and moment readings. Gauges 101 and 103 of the upper forward web group are interconnected with gauges 101 and 103 of the diametrically lower forward web group to form a Wheatstone bridge identified as forward side force Y1. Gauges 101 and 103 of the left side forward web group are interconnected with gauges 101 and 103 of the diametrically opposite right side forward web to form a Wheatstone bridge identified as forward normal N1. In a like manner the gauges 101 and 103 on the aft web groups are interconnected to form aft side force Y2 and aft normal N2.

Figure 9A:
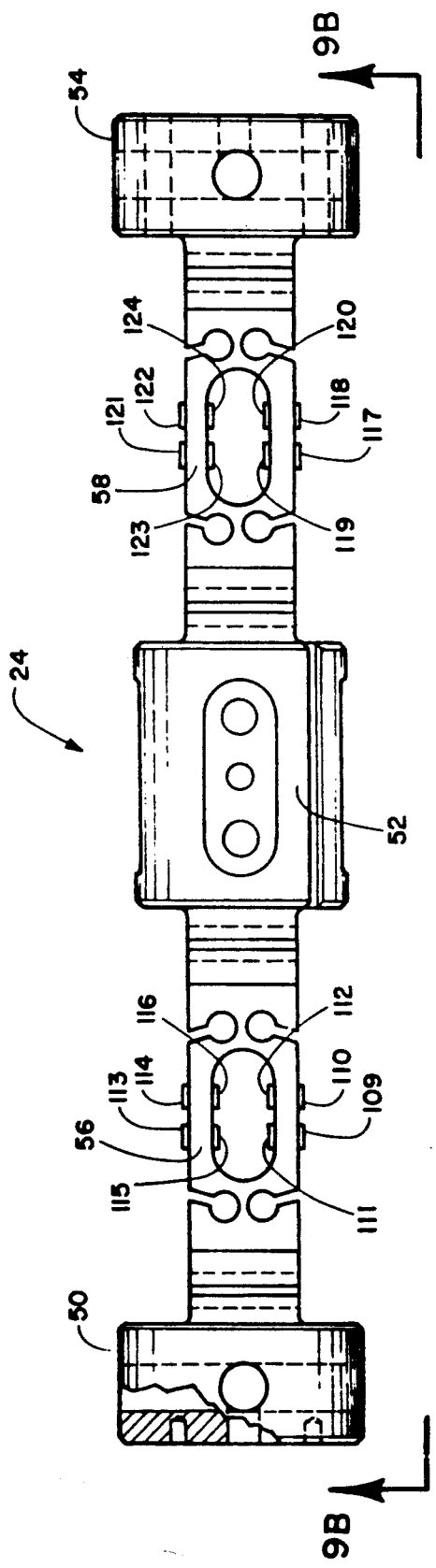
FIG. 9a is a side elevation view of the axial member.
Figure 9B:
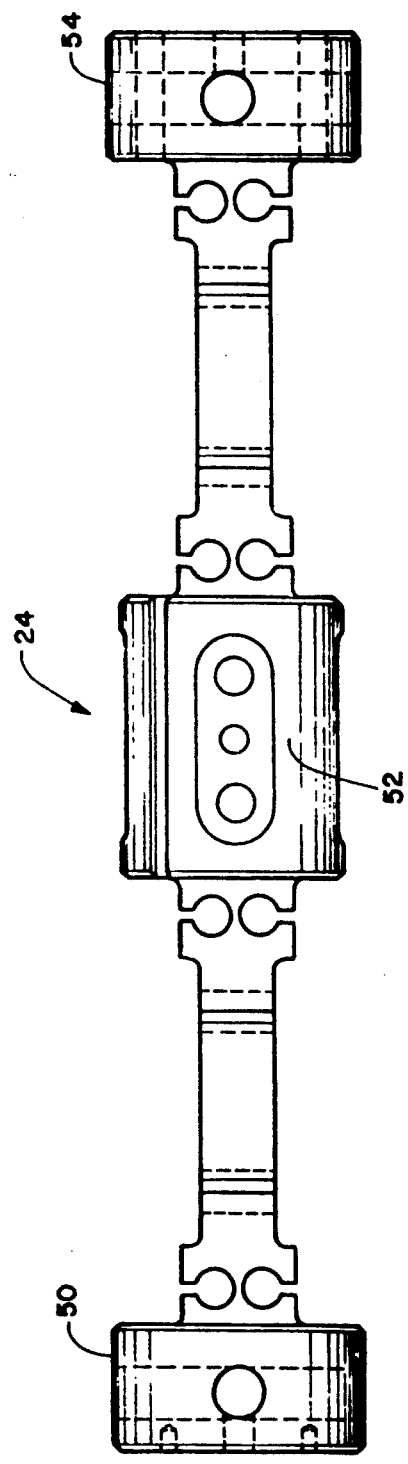

Axial member 24 is illustrated in FIGS. 9A and 9B. It has a front disk member 50, a central disk member 52, and an aft disk member 54. Forward gauged section 56 has eight precision strain gauges bonded on it at the locations indicated. Aft gauged section 58 also has eight precision strain gauges bonded thereon for a total of 16 gauges.

The aforementioned 16 strain gauges are electrically interconnected in Wheatstone bridges in various combinations to measure axial force. Gauges 109, 114 and 116 are interconnected to form a bridge identified as forward axial X1. Gauges 110, 112, 113 and 115 are interconnected to form a Wheatstone bridge identified as forward axial X2. Strain gauges 117, 119, 122 and 24 are interconnected to form a Wheatstone bridge identified as aft axial X1. Strain gauges 118, 120, 121 and 123 are interconnected to form a bridge aft axial X2. By wiring forward axial X1 and aft axial X1 bridges in parallel they mathmatically add and average the outputs from each independent bridge, resulting in an arrangement where opposite deflections, such as caused by temperature and pressure changes are nulled out leaving the axial force loads as the only output of the circuits. The forward X2 and aft X2 are also wired in parallel to produce the same effect, the axial force loads as the only output of the circuits. The total X1 bridge will be the primary bridge and the total X2 will be a spare for back-up in case of failure of the X1 bridge. The axial bridge is completed including temperature compensation and installation of the element in the balance. Before any additional connections of gauges on the outer shell assembly are made a series of calibration loadings are recorded for each of the unconnected gauges, to determine which gauges indicate least interaction and greatest accuracy. From gauges 102, 104, 105 and 106 of each group of the four forward webs (total of sixteen gauges), four are selected and interconnected to form a Wheatstone bridge identified as forward roll R1 and from the four aft group of webs four are selected and interconnected to form a Wheatstone bridge identified as aft roll R1.

Six Wheatstone bridges have been identified on the outer shell assembly, three from the four forward groups of webs Y1, N1 and forward R1 and three from the four aft groups of webs YS, and aft R1. Forward R1 and aft R1 are wired in parallel, resulting in R1 roll total. The forward and aft roll are wired in parallel to compensate for dimensional changes in the outer shell caused by thermal and pressure effects. If the outer shell and inner rod experience dimensional changes the forward web groups and aft web groups deflect in opposite directions. Thus by wiring the roll bridges in parallel they mathmatically add and average the outputs from each independent bridge, resulting in an arrangement where opposite deflection such as caused by temperature changes, are nulled out leaving the roll loads as the only output of the circuit.

Six Wheatstone bridge outputs have been identified from the complete balance N1, Y1, N2, YS, total and X1 total. By use of calibration techniques and appropriate equations, which are well known to those skilled in the art, the outputs may be used to determine the total normal force, pitching moment, total side force, yawing moment, rolling moment and axial force acting on the balance.

While the balance has been shown and described as being cylindrical, it is understood that the invention is not limited to any particular cross section or dimensions. For example, the cross section may be square, hexagonal, or octagonal, etc. For utilization where more stiffness is required in one plane than another the cross section may be elliptical, rectangular or any other shape having a major axis.

What is claimed is:

1. A wind tunnel balance comprising: an elongated tubular inner rod having a predetermined length, said tubular inner rod having a front end, a rear end, a front annular portion, a center annular portion and a rear annular portion;
   the rear end of said tubular inner rod having structure for detachably connecting it to a sting;
   a model attachment outer shell assembly formed of a front annular section, a central annular section, and an aft annular section; a forward web section connects said front annular section to said central section; an aft web section connects said aft annular section to said central annular section;
   said tubular inner rod being inserted into said outer shell assembly;
   means for rigidly securing the front annular section of said outer shell assembly to the front annular portion of said tubular inner rod;
   means for rigidly securing the aft annular section of said outer shell assembly to the aft annular portion of said tubular Inner rod;
   the inner diameter of the central annular section of each outer shell assembly being greater that the outer diameter of the center annular portion of said tubular inner rod so that said central annular section of said outer shell assembly is free to move axially, laterally and rotationally;
   an elongated axial member positioned inside said tubular inner rod;
   said axial member having a front disk member, a central disk member and an aft disk member;
   means for rigidly connecting the central disk member of said axial member to the central annular section of said outer shell assembly so that they may move as a single unit;
   means for rigidly connecting the front disk member and the rear disk member of said axial member to the center annular portion of said inner rod so that they move as a single unit; and
   said axial member having a first flexure means connecting its front disk member to its central disk member and a second flexure means connecting its aft disk member to its central disk member.

2. A wind tunnel balance as recited in claim 1 wherein said outer shell assembly is formed of a single piece of material that has been machined to its desired configuration.

3. A wind tunnel balance as recited in claim 1 wherein said axial member is formed of a single piece of material that has been machined to its desired configuration.

4. A wind tunnel balance as recited in claim 1 wherein said means for rigidly connecting the central disk member of said axial member to the central annular section of said outer shell assembly comprises a plurality of axial adapters each having: a) an inner end that plugs into said central disk member, b) a shank portion that passes through axial adapter slots in the center annular portion of said inner rod, and c) a head portion that is received in a mating aperture in the central annular section of said outer shell assembly.

5. A wind tunnel balance as recited in claim 1 wherein said first flexure means comprises an axial bridge having relieved portions to enhance its flexibility in a vertical direction and relieved portions to enhance its flexibility in a horizontal directions.

6. A wind tunnel balance as recited in claim 5 wherein said second flexure means comprises an axial bridge having relieved portions to enhance its flexibility in a vertical direction and relieved portions to enhance its flexibility in a horizontal direction.

7. A wind tunnel balance as recited in claim 5 further comprising a plurality of strain gauges mounted on said axial bridge.

* * * * *